June 8, 1943.  J. W. MILLER  2,321,229
AUTOMATIC LEDGER SHEET SELECTOR
Filed Sept. 10, 1942   5 Sheets-Sheet 1

Inventor
Jay W. Miller,
By McMorrow and Berman
Attorneys

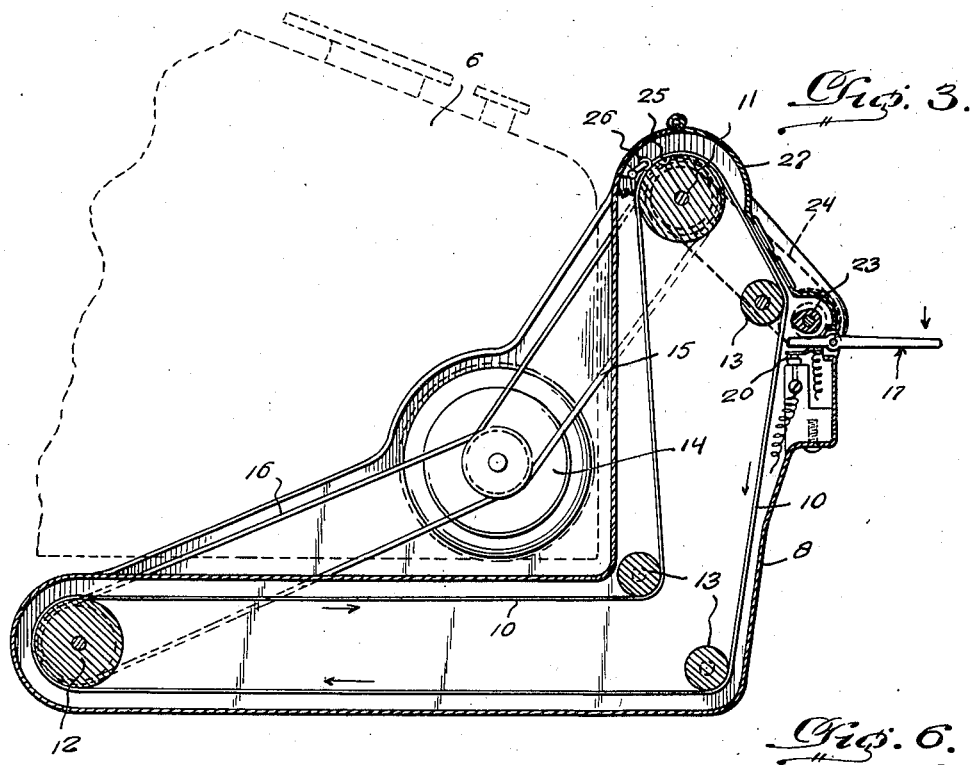
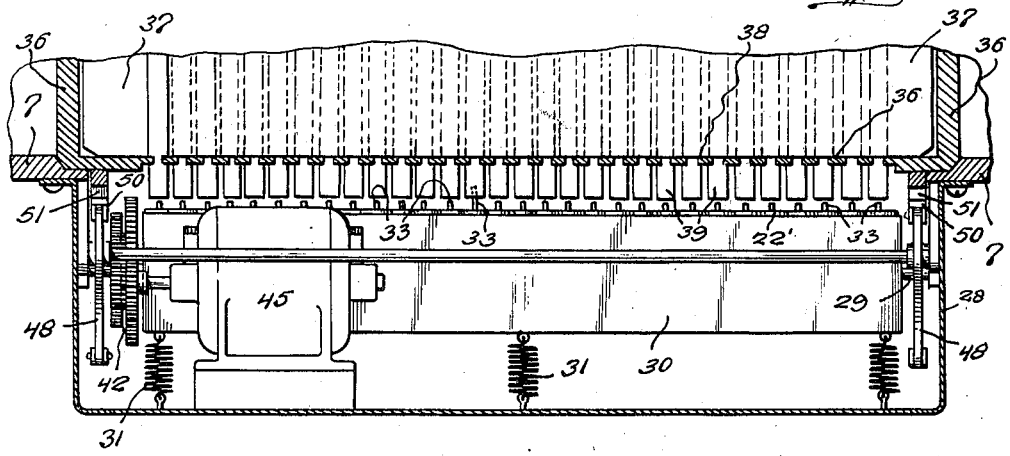
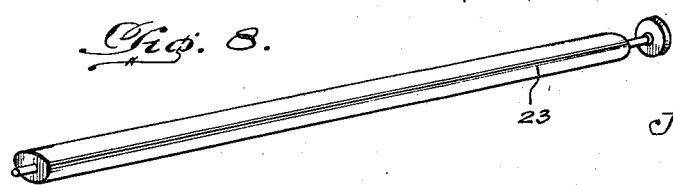
Inventor
Jay W. Miller,

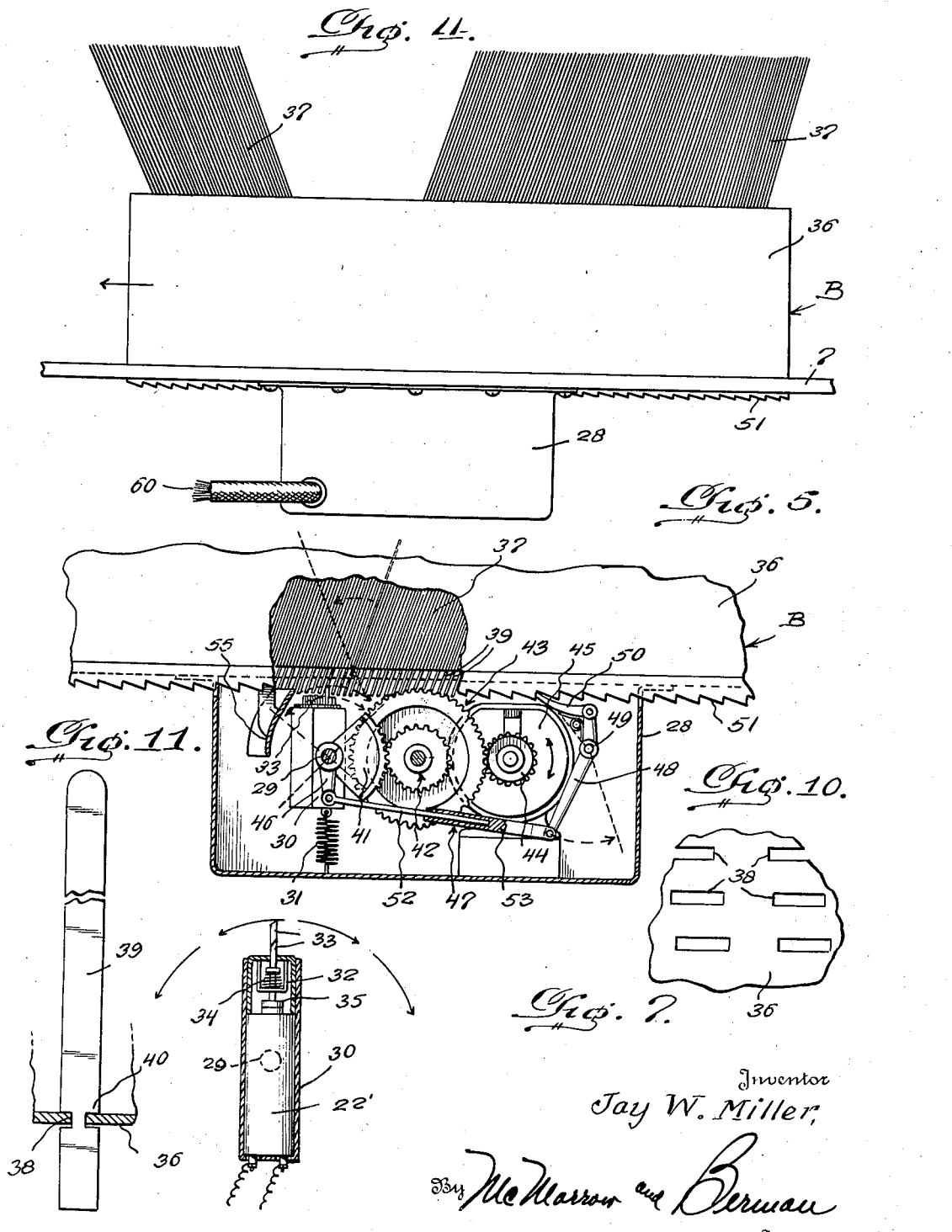

Inventor
Jay W. Miller

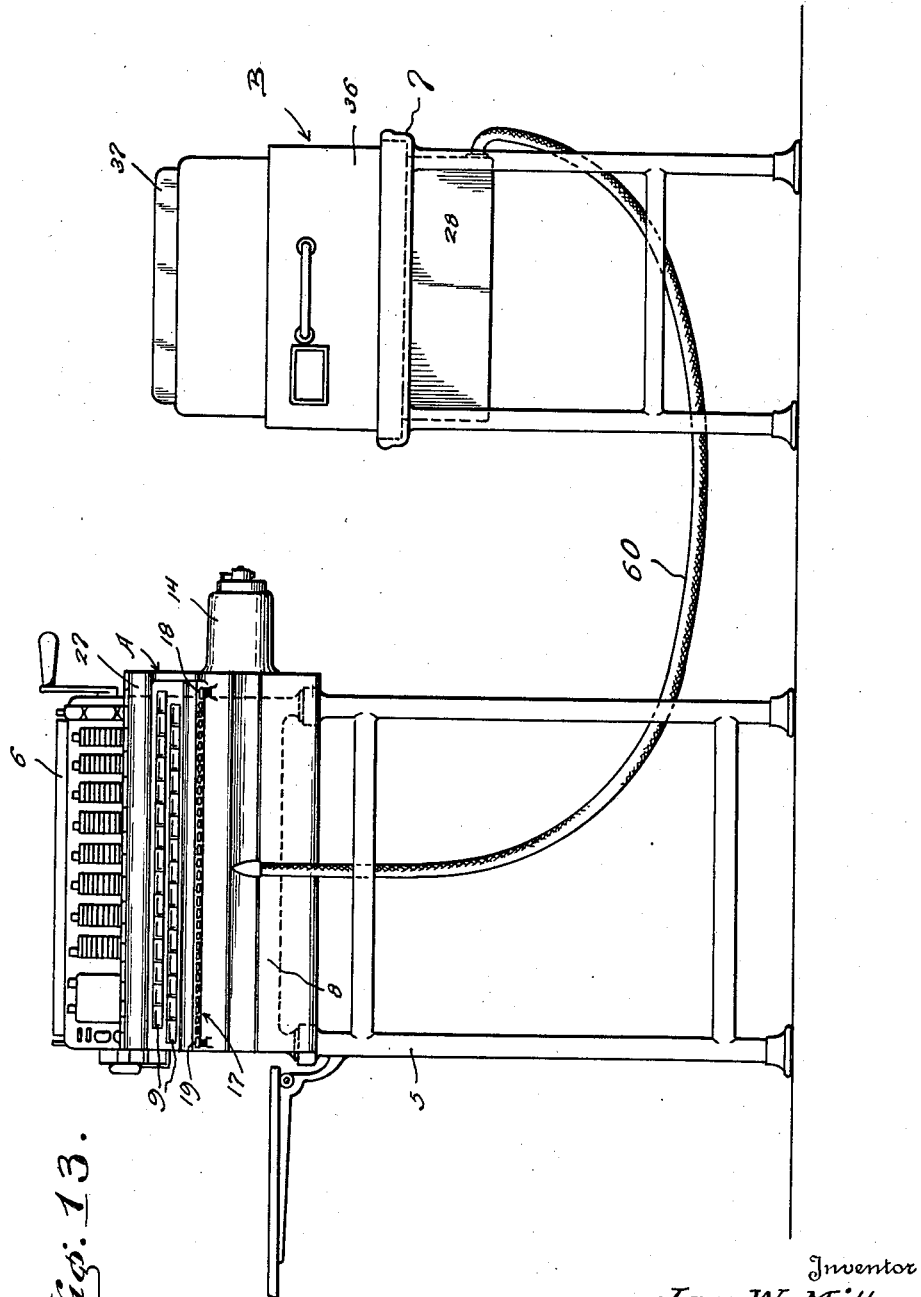

Patented June 8, 1943

2,321,229

UNITED STATES PATENT OFFICE 2,321,229

AUTOMATIC LEDGER SHEET SELECTOR

Jay W. Miller, La Junta, Colo.

Application September 10, 1942, Serial No. 457,895

4 Claims. (Cl. 129—16.1)

This invention relates to an automatic ledger sheet selector and is especially adapted to lessen manual work of persons engaged in operating account posting machines of the well known type.

The primary object of this invention is to provide a device of the above stated character which will obviate the necessity of the person operating the posting machine from having to manually turn or thumb through the various ledger sheets to obtain a ledger sheet for a desired account or party, the device also reducing the possibility of errors or mistakes in obtaining the desired ledger sheet and providing a great saving in time in carrying out the specified kind of work.

Another object of this invention is the provision of an electrically operated ledger sheet selecting mechanism, an indicator disclosing the names of the accounts of the ledgers to be posted, and a keyboard including selection keys, a master control key, and a reset key, which keys will permit the operator of the posting machine to easily and quickly bring into view one at a time the ledger sheets bearing the accounts of the names of parties selected from the indicator.

A further object of this invention is the provision of a carriage for the ledger sheets having said ledger sheets arranged in groups and in accordance with the groups of names of the accounts on the indicator and means for advancing the groups of ledger sheets when the desired ledger sheets of each group of ledger sheets have been selected by the operation of the sheet selecting means.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation illustrating a portion of a posting machine with a part of the present invention mounted thereon.

Figure 3 is a fragmentary vertical sectional view showing the apron for the support of the names of the accounts and movable relative to the windows by electrical means.

Figure 4 is a side elevation illustrating another part of the present invention and consisting of a rack or drawer for supporting the account sheets in groups.

Figure 5 is a fragmentary side elevation, partly in section, showing the means of selectively turning the account sheets in the rack or drawer and the means of advancing the rack or drawer on its support after the sheet of a group of sheets has been selected.

Figure 6 is a fragmentary transverse sectional view showing the sheet selecting means and the support for the rack or drawer.

Figure 7 is a sectional view illustrating one of the electro-magnets of the sheet selecting means and the pins therefor.

Figure 8 is a perspective view illustrating a cam employed for resetting of the selecting keys of the keyboard.

Figure 10 is a fragmentary plan view showing a portion of the bottom of the drawer or rack and the arrangement of the slots therein.

Figure 11 is a detail view, partly in section illustrating one of the sheet turning fingers and its pivotal mounting in the drawer or rack.

Figure 13 is a front elevation, illustrating the automatic ledger sheet selector mounted for operation.

Figure 1:
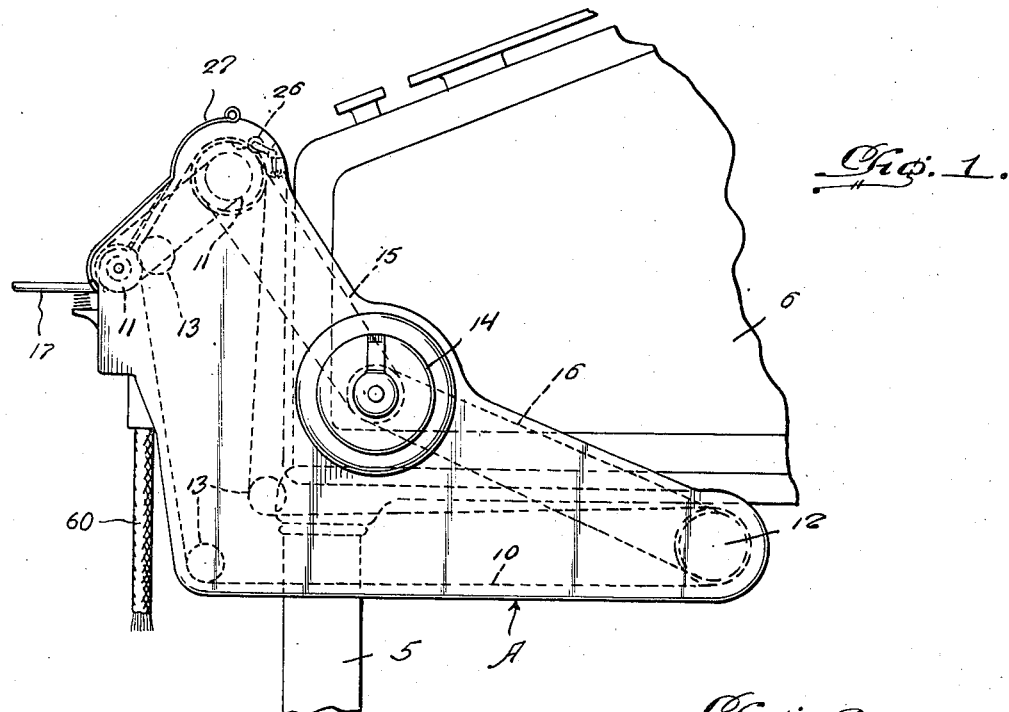
Figure 2:
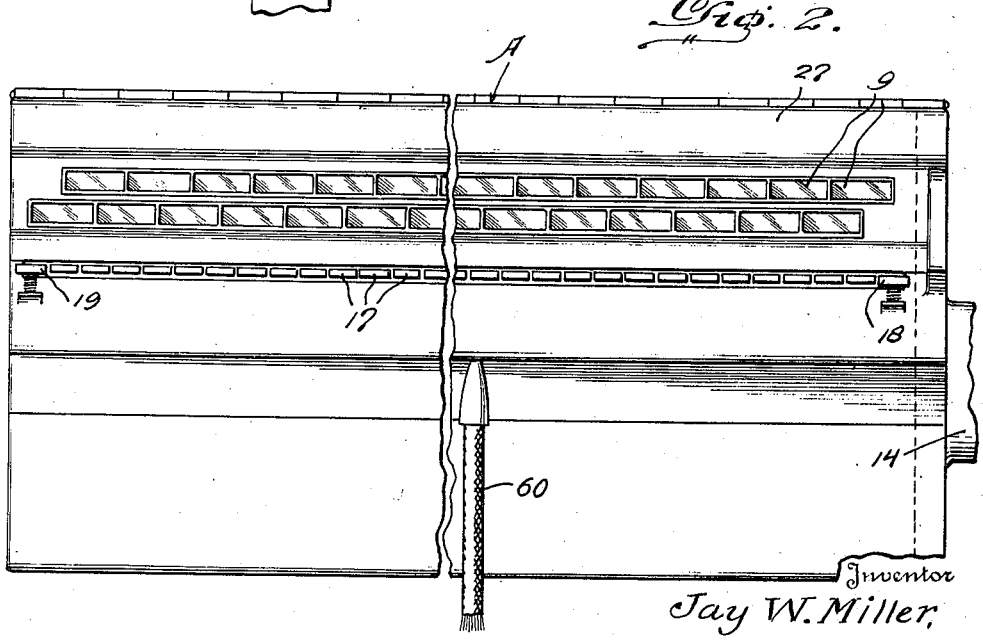
Figure 2 is a front elevation illustrating the part of the invention which is mounted on the posting machine and includes a group of windows for displaying the names of the accounts to be posted and a keyboard.

Referring in detail to the drawings, the character A indicates one of the units of the present invention and this unit is preferably mounted on the stand 5 employed for the support of a conventional type of posting machine 6. The other unit of this invention is indicated by the character B and is mounted on the support 7 which may be of any desired construction.

The unit A includes a housing 8 of substantially L shape and when arranged on the stand 5 one portion thereof is disposed vertically in front of the posting machine and has therein groups of windows 9 through which groups of names of accounts to be posted may be viewed. The names of the accounts are arranged in groups on an endless apron 10 mounted in the housing 8 for movement in rear of the windows 9. The names may be applied to the apron in any well known manner, such as strips of material bearing the names being pasted or otherwise secured on the apron.

The apron is supported by drums 11 and 12 arranged adjacent the ends of the housing. The apron is further supported by a series of guide rollers 13, one of which is positioned adjacent the windows to cooperate with the drum 11 causing the apron to travel in close proximity to the windows. The casing or housing 8 supports an electric motor 14 connected to the drums 11 and 12 by belts 15 and 16.

The housing 8 below the windows supports a keyboard including a plurality of pivotally mounted sheet selecting keys 17, a reset key 18 and an operating key 19. It will be seen that the sheet selecting keys are grouped together while the resetting key and operating key are arranged at opposite ends of the group of selecting keys. The keys 18 and 19 are also pivotally mounted. Thus it will be seen that the keys of the keyboard are arranged in convenient reach of the operator operating the posting machine and also close to the windows in which the names of the accounts appear.

The keys 17 are for the purpose of operating electric switches 20. Said switches 20 are of the self-closing type and are opened by the actuation of the keys 17. The reset key operates a switch 21, the latter switch is normally open and is closed by the actuation of said key 18. The operating key 19 actuates a switch 22 which is normally open and is moved into closed position by the operating key 19. The switches 20 are for controlling electric circuits of electro-magnets 22' forming a part of the unit B and which will be hereinafter more fully described.

A reset cam 23 of elongated formation is journaled in the housing 8 above the keys 17 and is driven by the drum 11. An endless belt 24 is employed for connecting the cam to the drum 11 so that the cam will make one revolution during each revolution of the drum 11.

The drum 11 on its periphery and adjacent its ends is provided with sockets 25 to be engaged by pivotally mounted spring influenced rollers 26. The purpose of the rollers 26 entering the sockets 25 is to stop the rotation of the drum 11 after the drive of the electric motor 14 thereon has been discontinued so that a group of names on the apron will be positioned in rear of the group of windows 9. The rollers 26 may ride into and out of the sockets during the rotation of the drum 11 by the electric motor 14 and are pivotally mounted in the housing 8.

The housing above the drum 11 is provided with a hinged section 27 so that the housing can be opened to expose a portion of the apron 10 to permit the names to be applied and removed from the apron.

The pivots for the keys 17 are preferably of the frictional type so that said keys will remain in either of their positions, that is, in the position of opening the switches 20 or free of the switches. When the keys 17 are engaged by the high face of the cam 23 said keys are returned to a position of disengagement from the switches 20, allowing the latter to assume closed position.

The keys 18 and 19 are spring influenced so that when said keys are manually released they will assume the position of permitting the switches 21 and 22 to open. Said keys 18 and 19 are not influenced by the cam 23.

The support 7 of the unit B has mounted thereon a housing 28. The electro-magnets 22' are secured together in a group on a shaft 29 journaled in the housing 28. A suitable housing 30 is employed for the mounting of the electro-magnets 22' in a group on the shaft whereby all of said magnets will move in unison with the shaft during its rotation in opposite directions. Coil springs 31 are connected to the housing 30 and to the casing 28 for normally sustaining the electro-magnets in vertical position. The housing 30 carries brackets 32 positioned directly over the electro-magnets and in which are slidably mounted selecting pins 33 spring influenced, as shown at 34, so that said pins will move outwardly away from the electro-magnets when the latter are deenergized. When the electro-magnets are energized and the pins or their armatures 35 are within the range of the magnetism of the electro-magnets, said selecting pins 33 will be held in a retracted position against the influence of the springs 34.

The support 7 of the unit B has slidably mounted thereon a rack or drawer 36 in which are arranged account sheets to be posted on the posting machine and as designated by the character 37. The sheets 37 are arranged in groups and the sheets of each group are either alphabetically arranged or numerically. Rows of slots 38 are formed in the bottom of the drawer or rack 36. There will be a row of slots 38 for each group of sheets 37. The number of slots in each row will be in accordance with the number of sheets to each group of sheets. By referring to Figure 10 it will be seen that the rows of slots 38 extend transversely of the bottom of the drawer or rack 36 and each slightly in advance of the other.

The electro-magnets 22' are grouped so that they extend transversely of the rack or drawer and thereunder and will align with each row of slots as the rack or drawer is advanced in a step by step manner on the support 7.

Engaging with the sheets 37 are selecting fingers or strips 39 notched, as shown at 40, to extend through the slots 38 with the lower ends thereof terminating a limited distance below the bottom of the rack or drawer 36. The fingers or strips 39 being arranged in the slots 38 for pivotal movement will be in groups in accordance with the groups of sheets 37. The lower ends of the strips or fingers 39 due to the arrangement of the slots 38 will be arranged in rows with the lower ends staggered or slightly stepped and to be in the path of movement of the pins 33 when in extended position so that when the shaft 29 is rotated in one direction, causing the magnets to swing in the direction of the arrows to the right in Figure 7, the pins which are in extended position will engage the lower ends of the fingers or strips 39 lying in their path and cause said strips to pivot and thereby turn in a selected manner the sheets of each group of sheets within the rack or drawer 36. That is, the operator may through the actuation of the keys 17 deenergize certain of the electro-magnets so that the pins of the deenergized magnets will move into extended position and when the magnets are swung as a unit the extended pins will engage the fingers of selected sheets of one group of sheets and turn them. This arrangement permits the person operating the posting machine to select any desired sheet of a group of sheets and any number of sheets in each group.

The notches 40 in the fingers or strips 39 besides cooperating with the slots 38 in pivotally supporting said fingers or strips in the drawer or rack 36, will permit the strips to be removed from the slots whenever desired by giving the strips or fingers 39 a half turn.

A segmental shaped gear 41 is secured to the shaft 29 and meshes with a gear 42 forming a part of a train of gears 43. The train of gears are suitably journaled within the housing 28 and the gear 44 thereof is secured to a shaft of an electric motor 45 mounted in the housing 28 and of the reversible type.

The electric motor 45 is caused to rotate in one direction by the operating key 19 and to rotate in a reverse direction by the reset key 18. When the operating key 19 is actuated, the electric motor 45 will rotate in a direction to bring about swinging movement of the electro-magnets to the right in Figure 7 so that whatever pin 33 is in extended position will engage the lower end of the finger 39 in the path of said pin and turn the sheet engaged by the strip or finger so that it may be brought in position for easy removal from the drawer or rack and for insertion into the posting machine to have the account posted thereon. Of course, it is to be understood that this sheet after being posted is returned to its original position within the rack or drawer.

As soon as the electric motor 45 is deenergized, the springs 31 return the electro-magnets to vertical position. The distance the electro-magnets will swing to the right in Figure 7 is controlled by the number of teeth on the segmental shaped gear 41 as this gear may move out of mesh with the gear 42 after the electric motor 45 has made a number of revolutions.

Arms 46 are secured to the shaft 29 and have pivoted thereto pitmans 47 which are in turn pivotally connected to bell crank levers 48 pivotally mounted in the housing 28, as shown at 49. The bell crank levers 48 have pivoted thereto spring influenced dogs 50 which engage teeth of rack bars 51 secured to the drawer or rack 36. It will be noted that the pitmans 47 are constructed of sections 52 and 53. The section 53 is socketed to receive the section 52 so that when the shaft 29 rotates to swing the electro-magnets to the right in Figure 7 for selectively turning the sheets 37, the sections 52 of the pitmans will move free of the sections 53 and consequently permit the dogs 50 to remain inactive. However, when the shaft 29 is rotated in a reverse direction, the sections 52 of the pitmans abut the sections 53 and cause the dogs 50 to act on the teeth of the rack bars and step the drawer or rack forwardly sufficient to bring the next group of sheets into position of being acted upon by the pins of the electro-magnets. During the movement of the shaft 29 to actuate the dogs 50, the pins which are in extended position engage a stop 55 and are retracted so that the armatures thereof will be in range of the magnetism of the electro-magnets and consequently will be held in retracted position. As soon as the electric motor 45 is deenergized the electro-magnets return to vertical position from a position left of that shown in Figure 7.

Figure 9:
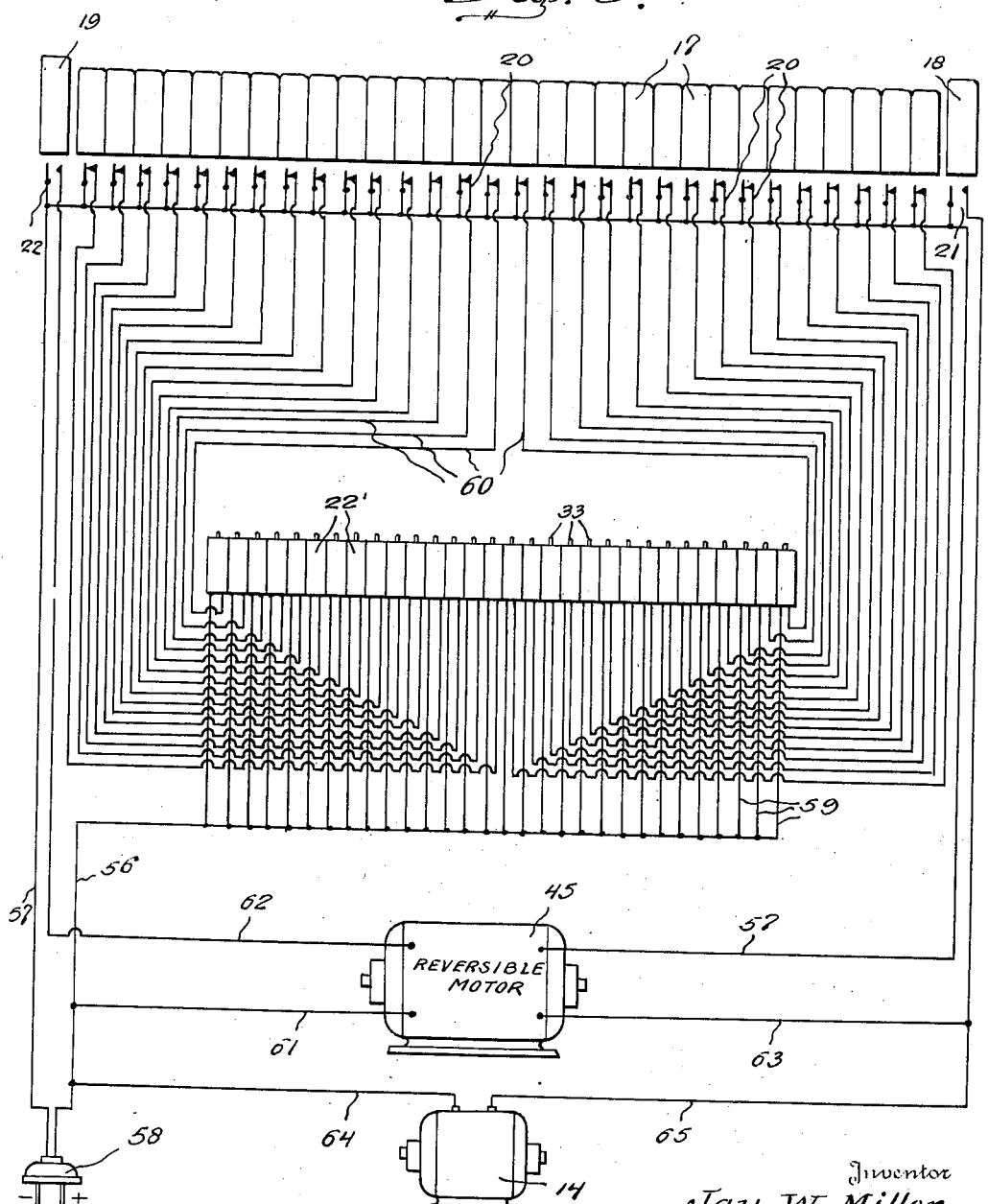
Figure 9 is a diagrammatical view illustrating the wiring diagram of the present invention.
Figure 12:
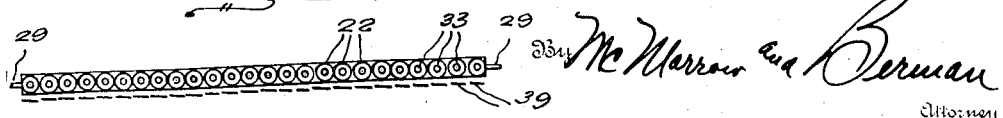
Figure 12 is a diagrammatical view showing the arrangement of the electro-magnets and pins with respect to one group of sheet turning fingers.

Referring to the wiring diagram shown in Figure 9, it will be seen that the positive and negative electric leads are indicated by the characters 56 and 57 and are connected to a plug type fixture 58 so that said leads may be connected into a conventional electric output (not shown). The negative lead 57 is electrically connected to one of the terminals of the switches 19, 17 and 18 and to one of the terminals of the reversible electric motor 45. The positive lead 56 is connected to a terminal of each of the electro-magnets 22' by a series of conductors 59. The other terminals of the electro-magnets have conductors 60 connected thereto which are in turn connected to the other terminals of the switches 20.

One of the terminals of the reversible motor 45 is connected to the positive lead 56 by a conductor 61 and another terminal of the reversible electric motor is connected to the switch 22 by a conductor 62. Another terminal of the reversible motor 45 is connected to a conductor 63 which is in turn connected to the switch 21. Conductors 64 and 65 are connected to the terminals of the electric motor 14 and the conductor 65 is connected to the conductor 63 so as to be placed in circuit with the switch 21 operated by the reset key 18. The conductor 64 is connected to the positive electric lead 56. When the switch 22 is closed by the actuation of the operating key 19, the electric motor 45 will be caused to rotate in one direction and in the direction of swinging the electro-magnets to the right in Figure 7. When the switch 21 is closed by the reset key 18, the electric motor 45 will be caused to rotate in a reverse direction for swinging the electro-magnets to the left in Figure 7 for the purpose of retracting whatever pins are in an extended position and for advancing the drawer or rack 36 to bring another group of sheets in position to be selected by the pins of the electro-magnets during another cycle of operation of the device. When the reset key 18 is operated to close the switch 21, the electric motor 14 is energized causing the endless apron 10 to be advanced to bring another group of names in view through the groups of windows 9, also to actuate the cam 23 for resetting the keys 17 which have been operated in the previous cycle of operation of the device.

When the operator of the posting machine desires to post the amounts of checks and the like on the ledger sheets, the latter are arranged in the drawer or rack 36 and the checks or the like are assorted alphabetically. The operator then notes the uppermost check and the names appearing in the windows and if a name appearing in a window agrees with the check the key 17 under that window is depressed closing the circuit to the electro-magnet connected to the switch of the depressed key which deenergizes the electro-magnet and the pin thereof moves into an extended position. The operator then depresses the operating key 19 which starts the electric motor 45 and the electro-magnets are swung to the right in Figure 7. The pin which is in projected position engages the strip 39 lying in the path thereof and causes the ledger sheet engaged by the strip to be swung over so that it will come into view and be ready to be removed and placed in the posting machine for posting the amount of the check thereon. This same operation will be repeated in connection with all of the sheets of the first group of sheets in which the names correspond with the names of the checks to be posted. When a name of a check appears and is not viewable through the windows, the operator depresses the reset key 18 which operates the motor 45 in a reverse direction causing the drawer or rack 36 to be advanced to bring another group of sheets in position to be actuated by the magnets. The depression of the key 18 also will bring about the swinging of the electro-magnets to the left in Figure 7 for the purpose of bringing the extended pin or pins into engagement with the stop 55 and the latter acts to move the pins inwardly within the field of magnetism of the magnets so as to be held in retracted position. At the time the key 18 is depressed the motor 14 will be set in operation bringing another group of names in view through the windows. This same operation described is repeated on the next group of sheets until all of the checks on hand have been posted.

Thus it will be seen that the operator can easily and quickly select any sheet of a group of sheets and bring the selected sheet in view for removal and positioning in the posting machine and return the sheet to its original position in the draw or rack after being posted. Thus this operation will permit the operator to rapidly carry out posting operations on the sheets with the chances of making errors reduced to a minimum and eliminate the necessity of the operator having to thumb through or turn the various sheets manually in order to retain a desired sheet for posting an account.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a sheet selecting device, a support, a rack on said support and having sheets therein, pivotal fingers carried by the rack and engaging the sheets for the turning of the latter, a series of electro-magnets mounted for pivotal movement on the support, spring influenced slidable pins carried by the magnets and normally held retracted by the magnets when energized to be out of the path of said fingers and adapted to move into extended position on the deenergization of the magnets, an electric circuit having said magnets electrically connected therein for the energization of the magnets, manually operated means connected in said circuit for selectively deenergizing the magnets to selectively free the pins for movement into extended position to selectively engage the fingers, a manually controlled electrically operated means connected in the circuit for imparting pivotal movement to said magnets and pins whereby the pin in extended position will engage and pivot a finger for selecting a sheet from the sheets within the rack.

2. In a sheet selecting device, a support, a rack on said support and having sheets therein, pivotal fingers carried by the rack and engaging the sheets for turning of the latter, a series of electro-magnets mounted for simultaneous pivotal movement on the support, spring influenced slidable pins carried by the magnets and normally held in retracted position by the magnets when energized to be out of the path of said fingers and adapted to move into extended position on the deenergization of the magnets, an electric circuit having said magnets electrically connected therein for the energization of the magnets, a plurality of manually actuated key operated switches electrically connected in the circuit for selectively deenergizing the magnets to selectively free the pins for movement into extended position to selectively engage the fingers on pivotal movement of the magnets, and an electric operated means electrically connected in the circuit for pivoting the magnets and including a manually actuated key operated switch for the control thereof.

3. In a sheet selecting device, a support, a rack slidable on said support and having sheets therein, pivotal fingers carried by the rack and arranged in groups and engaging the sheets for turning selectively the sheets and for arranging the latter in groups in accordance with the grouping of the fingers, a rotatable housing extending under the rack, electro-magnets mounted in said housing for pivotal movement in opposite directions by the rotation of the housing in opposite directions, spring means connected to said housing for the return of the latter to its initial position after being rotated in either direction, spring influenced pins slidable in the housing and held in retracted position by the magnets when energized to be out of the path of a group of said fingers and adapted to move into extended position on the deenergization of the magnets to come in the path of said last-named group of fingers, an electric circuit having said magnets electrically connected therein for the energization of the magnets, manually actuated key operated switches electrically connected in the circuit for selectively deenergizing the magnets to selectively free the pins for movement into extended position to selectively engage the fingers of one group of fingers, a reversible electric motor connected in said electric circuit, drive means between said motor and housing, a key operated switch electrically connected in the circuit for the operation of the motor to pivot the magnets and pins in one direction for actuating the fingers engaged by the pin in extended position to select a sheet from one of the groups of sheets, means for moving the extended pin into retracted position during the pivotal movement of the magnets and pins in a reverse direction by the motor, a key operated switch connected in the circuit for the operation of the motor in a reverse direction, and means connected to the drive means for sliding the rack in a step by step movement during each operation of the motor in the reverse direction to advance the groups of fingers and sheets relative to the pins.

4. In a sheet selecting device, a support, a rack slidable on said support and having sheets therein, pivotal fingers carried by the rack and arranged in groups and engaging the sheets for turning selectively the sheets and for arranging the latter in groups in accordance with the grouping of the fingers, a rotatable housing extending under the rack, electro-magnets mounted in said housing for pivotal movement in opposite directions by the rotation of the housing in opposite directions, spring means connected to said housing for the return of the latter to its initial position after being rotated in either direction, spring influenced pins slidable in the housing and held in retracted position by the magnets when energized to be out of the path of a group of said fingers and adapted to move into extended position on the deenergization of the magnets to come in the path of said last-named group of fingers, an electric circuit having said magnets electrically connected therein for the energization of the magnets, manually actuated key operated switches electrically connected in the circuit for selectively deenergizing the magnets to selectively free the pins for movement into extended position to selectively engage the fingers of one group of fingers, a reversible electric motor connected in said electric circuit, drive means between said motor and housing, a key operated switch electrically connected in the circuit for the operation of the motor to pivot the magnets and pins in one direction for actuating the fingers engaged by the pin in extended position to select a sheet from one of the groups of sheets, means for moving the extended pin into retracted position during the pivotal movement of the magnets and pins in a reverse direction by the motor, a key operated switch connected in the circuit for the operation of the motor in a reverse direction, a rack bar carried by said rack, a spring influenced pivotally mounted dog coacting with the rack bar, a pitman of sectional formation with one section telescoping into the other for a limited sliding movement in one direction connected to said dog, means for connecting the pitman to the housing for actuation thereby during the pivotal movement of the housing in one direction for the advance of the groups of fingers and sheets relative to the pins during the operation of the motor in a reverse direction.

JAY W. MILLER.